US007440745B2

(12) United States Patent
Turina et al.

(10) Patent No.: US 7,440,745 B2
(45) Date of Patent: Oct. 21, 2008

(54) SIGNALING IN A MOBILE CELLULAR COMMUNICATION NETWORK WITH POOLED MSCS

(75) Inventors: Klaus Turina, Backnang (DE); Josephus Kuster, Prosper, TX (US); Dimitris Papadimitriou, Dallas, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 479 days.

(21) Appl. No.: 10/909,602

(22) Filed: Aug. 2, 2004

(65) Prior Publication Data

US 2005/0054348 A1 Mar. 10, 2005

Related U.S. Application Data

(63) Continuation of application No. 09/704,631, filed on Nov. 2, 2000, now Pat. No. 6,771,983.

(51) Int. Cl.
*H04Q 7/20* (2006.01)
*H04M 1/00* (2006.01)

(52) U.S. Cl. .................. 455/403; 455/428; 455/434; 455/445; 455/560

(58) Field of Classification Search ............... 455/433, 455/428, 434, 438, 435.2, 445, 515, 453, 455/560
See application file for complete search history.

(56) References Cited

U.S. PATENT DOCUMENTS

| 5,873,042 A | 2/1999 | Vo |
| 6,097,951 A | 8/2000 | Ernam et al. |
| 6,129,604 A * | 10/2000 | Maveddat et al. ........... 455/453 |
| 6,131,026 A | 10/2000 | Badillo |
| 6,272,339 B1 | 8/2001 | Wiedeman |
| 6,292,667 B1 | 9/2001 | Wallentin et al. |

(Continued)

FOREIGN PATENT DOCUMENTS

| WO | WO 99/08392 A | 2/1999 |
| WO | WO 00/60816 A | 10/2000 |

OTHER PUBLICATIONS

Signalling Connection Control Part Procedures; Series Q: Switching and Signalling; Specifications of Signalling System No. 7—Signalling Connection Control Part International Telecommunication Union; ITU-T (Telecommunication and Standardization Sector of ITU); pp. 1-165.
3rd Generation Partnership Project (3GPP); Technical Specification Group (TSG) CN; Universal Mobile Telecommunications System (UMTS); Turbo-Charger; pp. 2-18.
Mouley-Pautet; The GSM System For Mobile Communications; Architecture; Section 2.1. Sub-Systems; pp. 89-109.

(Continued)

*Primary Examiner*—Simon Nguyen

(57) ABSTRACT

To achieve an efficient and flexible routing of signaling messages between a core network and an access network in a mobile communication cellular network, it is proposed to provide a pool of mobile switching apparatuses between the core network and the access network. Each mobile switching apparatus in the pool (10) comprises a signaling unit (32) adapted to issue a paging message to the access network for connection establishment to a mobile terminal. Further, according to the present invention it is proposed to provide each mobile switching apparatus in the pool (10) with a relay unit (28) adapted to receive a paging response from the access network. Further, the relay unit (28) is adapted to determine a mobile switching apparatus in the pool (10) of mobile switching apparatuses handling the paging response.

22 Claims, 11 Drawing Sheets

U.S. PATENT DOCUMENTS

| | | |
|---|---|---|
| 6,385,458 B1 | 5/2002 | Papadimitriou et al. |
| 6,424,638 B1 | 7/2002 | Ray et al. |
| 6,515,985 B2 * | 2/2003 | Shmulevich et al. ........ 370/356 |
| 6,535,741 B1 * | 3/2003 | Aschir et al. ................ 455/445 |
| 6,553,227 B1 * | 4/2003 | Ho et al. ..................... 455/433 |
| 6,615,041 B2 | 9/2003 | Adamany et al. |
| 6,625,473 B1 * | 9/2003 | Seok .......................... 455/560 |
| 6,697,620 B1 | 2/2004 | Lamb et al. |
| 6,724,801 B1 * | 4/2004 | Sylvain ....................... 455/433 |

OTHER PUBLICATIONS

Mouley-Pautet; The GSM System for Mobile Communications; Mobility and Security Management; Section 7.1; pp. 459-477.

* cited by examiner

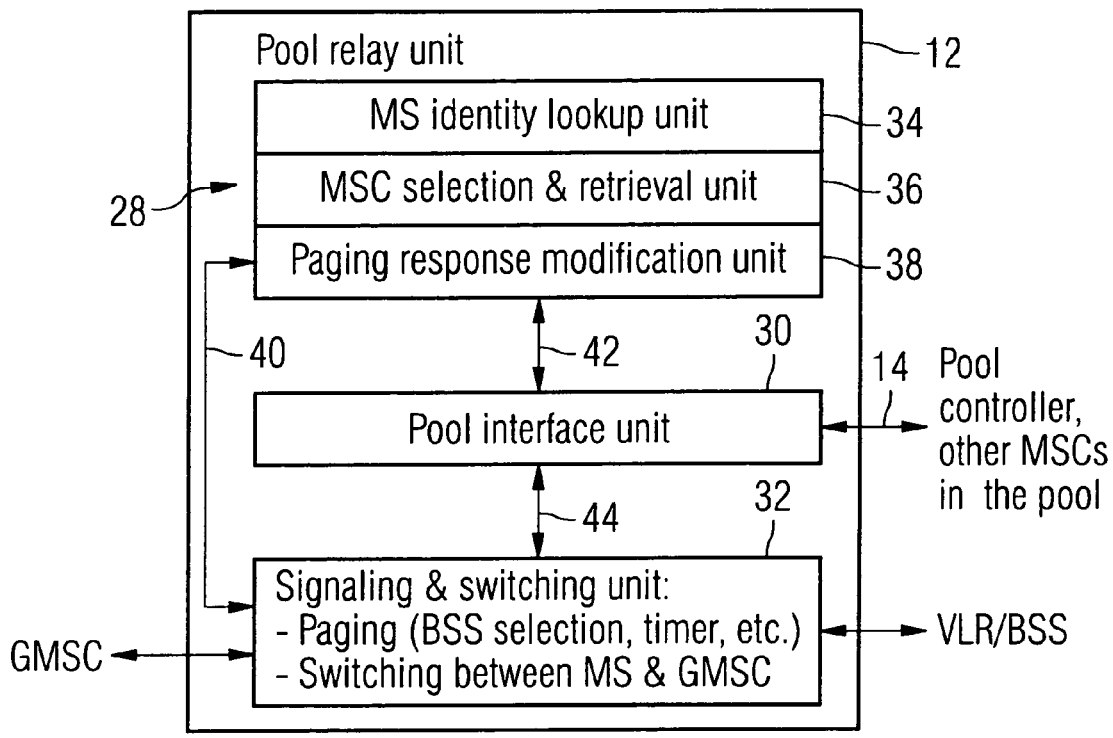
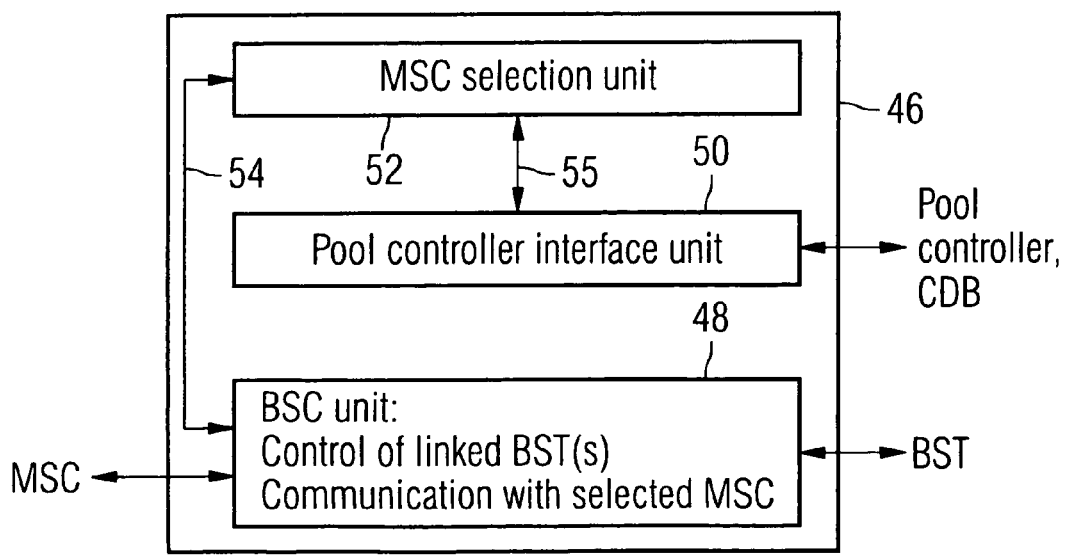

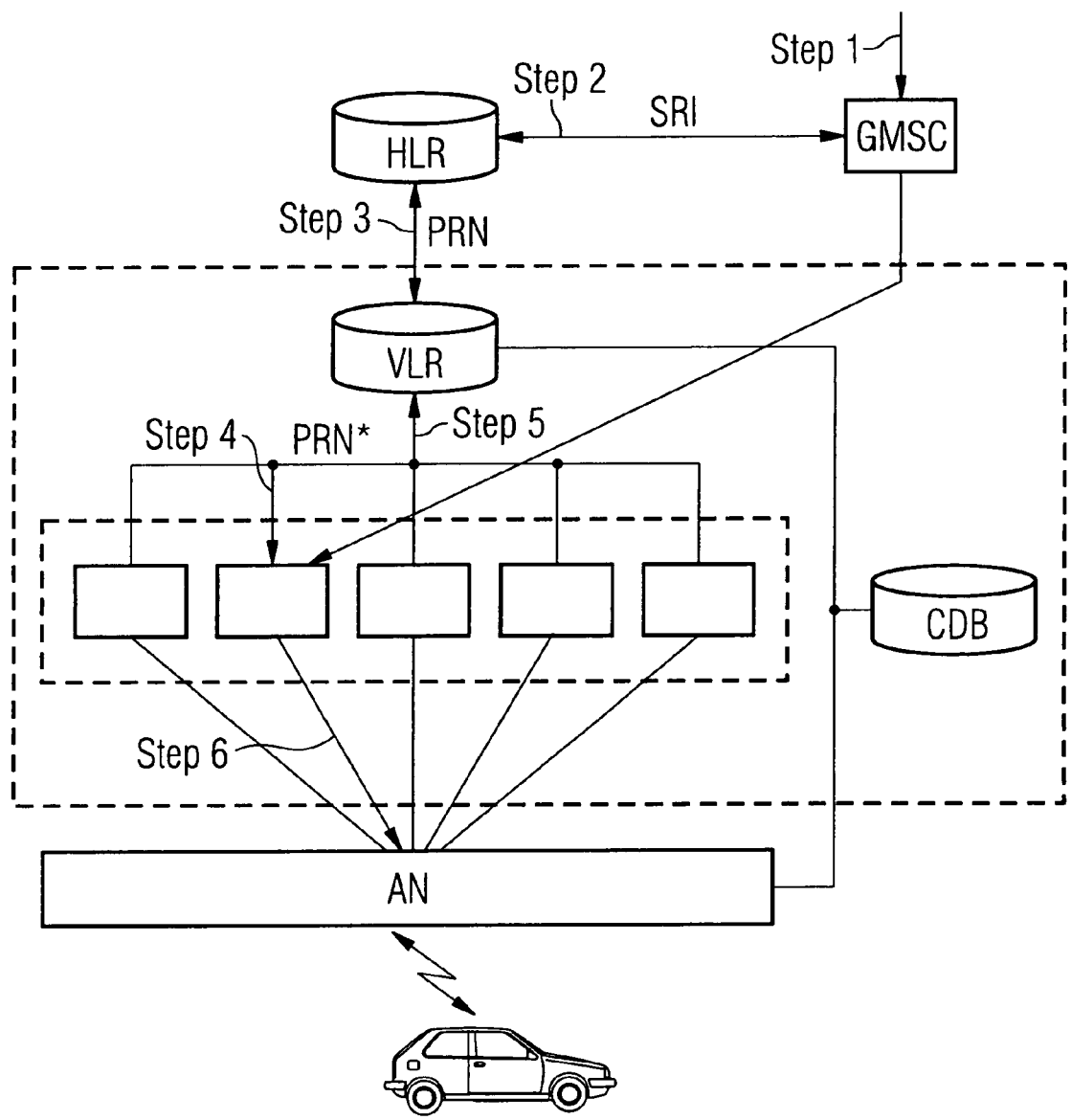

FIG. 10a
connection setup
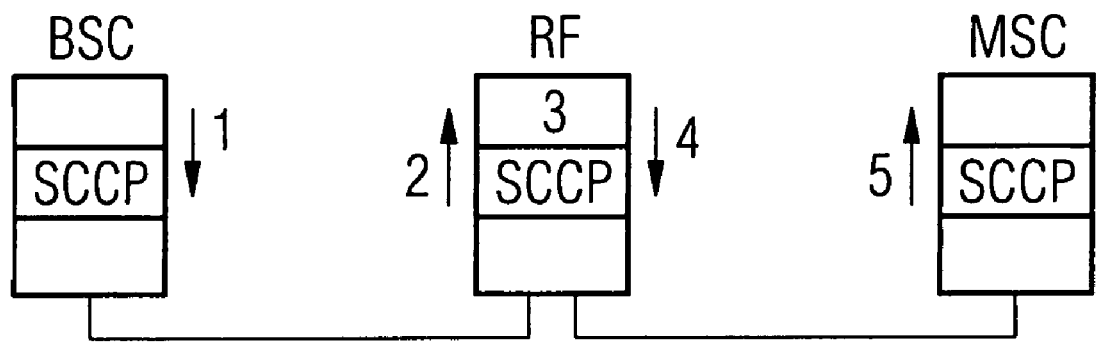
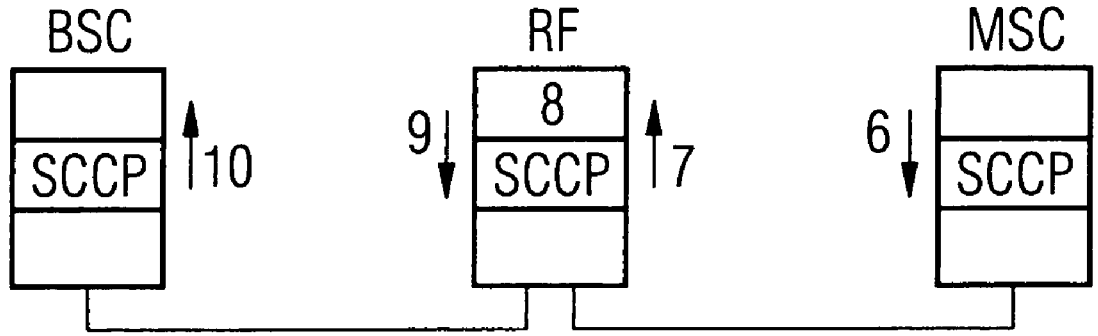
| | |
|---|---|
| 11 | 235 |
| 12 | 234 |
| | |
| | |

FIG. 10b
data transfer
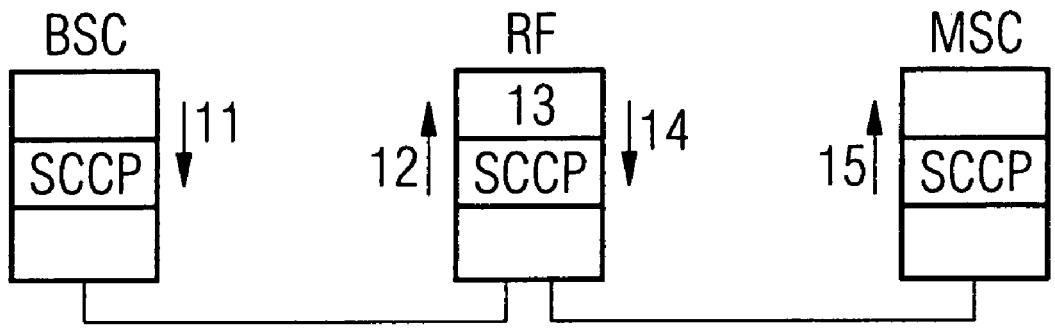
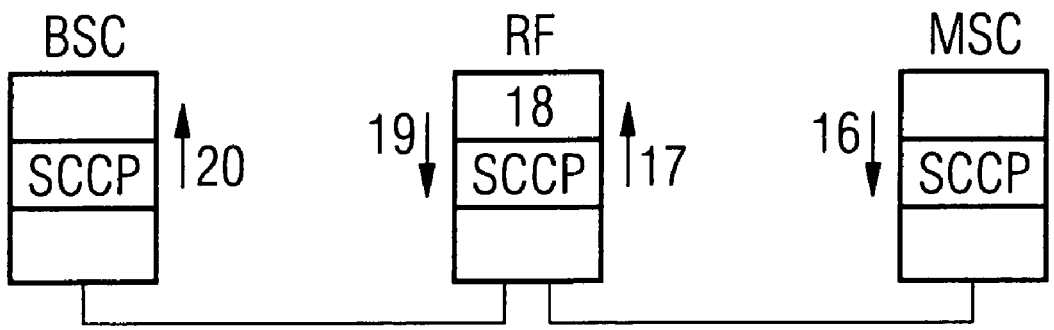
FIG. 10c
disconnection
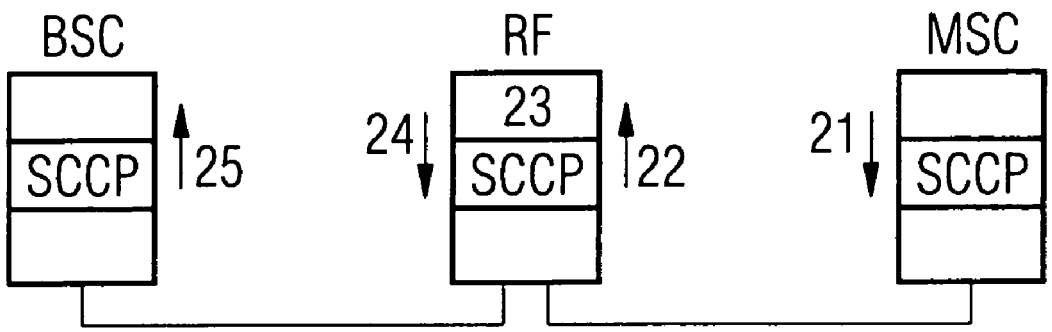

SIGNALING IN A MOBILE CELLULAR COMMUNICATION NETWORK WITH POOLED MSCS

FIELD OF INVENTION

The present invention relates to a mobile switching apparatus for use in a pool of mobile switching apparatuses provided for a mobile cellular communication network, a pool of mobile switching apparatuses, a router apparatus for operation between at least one access network control apparatus and a pool of mobile switching apparatuses and related methods.

BACKGROUND OF INVENTION

Basic subsystems for the architecture of mobile cellular communication systems are a core network and a radio access network.

As shown in FIG. 11, the core network comprises a gateway switching center GMSC, a mobile switching center MSC, further a home location register HLR, and a visitor location register VLR. The gateway switching center GMSC is connected to a plurality of mobile switching centers MSC and each mobile switching center MSC is connected to a visitor location register VLR. Different visitor location registers VLR are connected to the home location register HLR which is also linked to the gateway switching center GMSC.

As also shown in FIG. 11, each mobile switching center MSC serves a plurality of base station controllers BSC being itself connected to a plurality of base transceiver stations BTS for link establishment to mobile stations MS roaming in the area covered by the mobile cellular communication network.

The architecture of a mobile cellular communication network allows interworking between a fixed network such as a public switched telephone network PSTN like a national telephone network, an integrated services digital network ISDN, a public switched data network PSPDN and/or a public land mobile network PLMN like a global system for mobile communications GSM, a digital cellular system DCS 1800, a personal communication system PCS, and/or a third generation 3GPP mobile communication system.

Operatively, the home location register HLR stores two types of information, i.e. subscriber information and mobile information to allow incoming calls to be routed to a mobile station MS. Further, the visitor location register VLR is a functional unit that dynamically stores mobile station information, e.g., location area in case a mobile station is located in an area covered by the visitor location register VLR, and also subscriber profiles for visiting subscribers.

Further, the mobile switching center MSC performs necessary switching functions required for mobile stations MS covered by the mobile service switching center MSC. Also, the mobile switching center MSC monitors the mobility of its mobile stations MS and manages the necessary resources required to handle and update location registration procedures.

Besides the components of the core network of a mobile cellular communication network discussed so far, also components necessary to achieve a radio access to the mobile station must be provided in an access network. The access network comprises a plurality of, e.g., base station subsystems BSS for $2^{nd}$ generation mobile communication systems or radio network controllers RNC for $3^{rd}$ generation mobile communication systems. These subsystems correspond to physical equipment providing radio coverage to prescribed geographical areas known as cells illustrated as hexagonal geographical regions in FIG. 11. Each base station subsystem BSS contains equipment required to communicate with the mobile station MS.

Operatively, a base station subsystem BSS provides a control function implemented in a base station controller BSC/a radio network controller RNC and a transmitting function performed by a base station transceiver system BTS. The base station transceiver system BTS corresponds to a radio transmission equipment and covers each cell. A base station subsystem BSS can serve several cells because it may comprise multiple base transceiver systems BTS.

In mobile communication systems of the type outlined above the control of communication processes is achieved through signaling messages between control instances. Signaling messages are transferred both downlink to the mobile station for mobile terminating control signaling and uplink for mobile originating control signaling.

An example for mobile terminating control signaling in a mobile cellular mobile communication networks is the establishment of mobile terminating calls. This mobile terminating control signaling may be separated into two different phases. During establishment of a mobile terminating call the first phase consists of the following steps:

analysis of the called number (B-number) in the gateway switching center GMSC;

interrogation of the home location register HLR;

provision of a roaming number MSRN/TLDN through the visitor location register VLR;

routing of the call from the gateway switching center to the visited VMSC;

sending a paging request to an access node of the access network for further submission by the access node— e.g., a base station controller BSC or a radio network controller RNC—to the mobile terminal, e.g., by broadcasting.

Further, the second phase of a mobile terminating call establishment comprises the steps:

receiving a paging response from the called mobile station; and processing of the paging response and completion of the call setup.

It should be noted that between the mobile switching center MSC and the activated base station controller BSC handling the paging these two phases are treated as completely independent signaling transactions. Therefore, these different signaling transactions must be linked in the mobile switching center MSC. Within existing mobile communication networks this can be done, as the paging request is initiated by the same mobile switching center MSC that also receives the related paging response from the activated base station controllers. In other words, the two phases outlined above may be linked since each base station controller BSC is served by a single mobile switching center MSC only.

However, this simple mechanism will not work in case the 1:n relationship between a mobile switching center MSC and related base station controllers BSC is generalized to a case where each base station controller may be served by a plurality of mobile station centers MSC to increase network capacity and reliability.

In other words, when the base station controller BSC may initiate paging responses to mobile switching centers MSC different from the mobile switching center issuing the related paging request, the link between the two phases of mobile terminating call establishment outlined above cannot be achieved using the existing mechanisms as the mobile switching center MSC receiving a paging response may differ from the mobile switching center MSC initiating a related paging request.

Nevertheless, this might be a pre-requisite to meet future service demands since for large mobile cellular communication networks a static link between access nodes and mobile switching centers MSC could turn out to be an inefficient way of using the core network. When subscribers concentrate in one area—e.g., urban areas during business hours—or during disasters hitting only a certain area of the mobile communication network, the occasion would occur that a lot of calls overload a specific mobile switching center MSC while other mobile switching centers MSC in the mobile cellular communication network still have excess capacity to handle calls.

The problems become even more difficult when mobile communication networks cover very large areas, e.g., spanning more than one time zone. There exists no possibility to do load sharing over available mobile switching centers MSC to spread high load during peak hours in different time zones, e.g., between Dallas and Los Angeles.

Similar problems as outline above with respect to mobile terminal terminating signaling traffic also exist with respect to mobile terminal originating signaling traffic when access nodes have the choice to access different mobile switching centers MSC.

For BSS (TR 23.913 v 1.0.0) there is described a subscriber based mechanism for load distribution for $3^{rd}$ generation mobile cellular communication systems. Mobile station originating signaling messages are distributed to different mobile switching centers MSC on the basis of the subscriber identity comprised in a signaling message. However, this approach requires the analysis of signaling messages to find subscriber identities and therefore introduces delays as possible bottlenecks.

Referring only to subscriber identities could decrease the scope of flexibility. Further, when a mobile switching center is out of order related subscribers cannot receive signaling messages.

SUMMARY OF INVENTION

In view of the above, a first object of the present invention is to achieve an efficient relay of paging response messages to related paging requests in a core network with pooled mobile switching centers.

A second object of the present invention is to achieve an efficient and flexible routing of signaling messages between a core network and an access network.

According to the present invention, this object is achieved through a mobile switching apparatus for use in a pool of mobile switching apparatuses provided for a cellular communication network, comprising a signaling unit adapted to issue a paging message to an access network BSS/RNC served by the mobile switching apparatus for connection establishment to a mobile terminal MS, a relay unit adapted to receive a paging response from the access network BSS/RNC and to determine a mobile switching apparatus in the pool of mobile switching apparatuses handling the paging response, and a pool interface unit adapted to an exchange of information to at least one further mobile switching apparatus in the pool of mobile switching apparatuses.

Therefore, according to the present it is proposed to provide mobile switching apparatuses supporting a pool concept and having the capability of relaying a paging request issued by a mobile switching apparatus of the pool and a paging response received by a mobile switching apparatus of the pool.

The mobile switching apparatus according to the present invention is of particular use when service capabilities in existing mobile switching networks are extended, e.g., in highly congested rural areas, and/or to comply with an increasing number of subscribers in such mobile cellular communication networks. A particular advantage of the inventive mobile switching apparatus is that—as long as the frequency allocation for the different cells remains unchanged—the service capability of cellular mobile communication networks may be extended only by installation of a mobile switching server pool and providing an access to an existing access network or by extending an already existing mobile switching apparatus pool with additional mobile switching apparatuses according to the present invention. This concept requires only a very low administrative overhead in that the mobile switching apparatus pool has only a minimum impact on existing mobile communication infrastructure.

Further, the present invention allows to extend processing capacity in a mobile communication network by adding, e.g., mobile switching apparatuses to the pool having dedicated service capability, e.g., voice and/or data. Important to note that such an extension of services may be implemented without service interrupt and therefore without loss of revenues for the network operator.

Further, the integration of a plurality of mobile switching apparatuses according to the present invention into a pool allows to increase the area that may be reached through globing paging, i.e. the area reachable through all mobile switching apparatuses in the pool.

Yet another advantage of the mobile switching apparatus according to the present invention is that data necessary for the operation of each single mobile switching apparatus may be stored and updated at only single locations so that the administrative overhead for the operator to maintain correct data for the operation of each mobile switching apparatus in the pool—e.g., radio configuration data—is minimized.

In conclusion, the mobile switching apparatus according to the present invention allows to introduce a mechanism to spread signaling related functions over the pool of mobile switching apparatuses in a distributed architecture without the requirement to share the knowledge about the distributed architecture with the access network. It is possible to assign specific subscribers or services to a specific mobile switching apparatus in the pool. Also, the inventive concept is compatible with existing standards, e.g., second and future third generation cellular mobile communication networks.

According to a preferred embodiment of the inventive mobile switching apparatus, the relay unit comprises a mobile terminal identification unit adapted to evaluate whether a mobile subscriber issuing a paging response is known locally in the mobile switching apparatus.

This preferred embodiment of the invention allows to identify a situation where a mobile switching apparatus in the pool issuing a paging message to the access network is different from a mobile switching apparatus in the pool receiving a related paging response. In other words, this preferred embodiment forms the basis to realize the mobile switching apparatus pooling concept also for connectionless signaling processes.

According to another preferred embodiment of the present invention the relay unit comprises a retrieval unit adapted to identify the mobile switching apparatus in the pool issuing a paging message when the mobile subscriber issuing a related paging response is not known locally in the receiving mobile switching apparatus. Preferably, the receiving mobile switching apparatus in the pool may then submit the received paging response to the mobile switching apparatus issuing the paging message to the access network.

This preferred embodiment of the present invention provides a loop back mechanism for finalizing a paging process in the mobile switching apparatus in the pool that originally issued a paging message to the access network. This approach is highly efficient in that the data necessary for the handling of the paging response—e.g., the profile of a user requesting a mobile station terminating call—are known locally at the mobile switching apparatus issuing the paging message. In conclusion, the overall request for data transfer within the pool of mobile switching apparatuses and therefore the time required for processing the paging response is minimized.

The same advantage applies when the signaling unit is adapted to handle the paging response locally when the mobile subscriber issuing the paging response is known locally in the switching apparatus, e.g., when the paging response is received by the mobile switching apparatus that also issued the related paging message.

According to yet another preferred embodiment of the present invention the relay unit further comprises a selection unit adapted to specify a mobile switching apparatus in the pool handling the paging response according to a specified selection algorithm.

This preferred embodiment of the present invention allows to freely specify a mobile switching apparatus in the pool for processing of the paging response, irrespective of which mobile switching apparatus in the pool issued a paging message or which mobile switching apparatus in the pool received the related paging response. A particular advantage is that such an approach allows for free configuration of the mobile switching apparatus pool such that, e.g., dedicated mobile switching apparatuses are provided for specific services, user groups, and/or a combination thereof. Further, this preferred embodiment allows a dynamic spreading of offered signaling traffic over available mobile switching apparatus capacity in the pool in view of a dynamic change of available resources in each mobile switching apparatus of the pool.

According to yet another preferred embodiment of the present invention, the relay unit in the mobile switching apparatus comprises a paging response modification unit adapted to change a called address in the paging response to an address of the paging message originating mobile switching apparatus or to an address of the selected mobile switching apparatus. Preferably, the paging response modification unit is further adapted to notify a core network about a paging message modification.

This preferred embodiment of the present invention allows to always achieve consistency of data both in the core network and in the access network of the cellular mobile communication network. As long as the calling address—i.e. the address of the mobile equipment used by the subscriber—remains unchanged, always a consistent signaling between the core network and the access network is guaranteed. Even when the subscriber is moving (handover) signaling will still be consistent.

Further, to the advantages outlined above with respect to the inventive mobile switching apparatus it should be noted that the same principles may be used to relay a connection request within a single mobile switching apparatus internally in the case the handling of paging responses is distributed over multiple processors in a single mobile switching apparatus, e.g., using distributed memory.

Yet another advantageous application scenario for the mobile switching apparatus according to the present invention is global paging. Here, one solution within the framework of the present invention is to send a paging response to any mobile switching apparatus in the pool. The mobile switching apparatus may then inform all mobile switching apparatuses in the pool about the received mobile subscriber identity so that the one mobile switching apparatus that initiated the global paging message may, e.g., respond to the receiving mobile switching apparatus with its mobile switching identity for relaying the response to a global paging message thereto.

Yet another solution is that the paging response is sent to all mobile switching apparatuses in the pool. Each mobile switching apparatus will check whether the mobile subscriber is known locally. Then, the one mobile switching apparatus where the mobile subscriber is known locally will continue the processing of the paging response. The rest of the mobile switching apparatuses in the mobile will discard the paging response.

A second aspect of the present invention relays to a pool of mobile switching apparatuses operated in a cellular communication network. The pool comprises at least two mobile switching apparatuses as described above, a pool controller adapted to select a mobile switching apparatus in the pool for issuing a paging message to an access network served by the pool. The paging message serves to establish a connection to a mobile terminal. Further, the pool comprises a pool data base adapted to store the paging message in relation to the selective paging message issuing mobile switching apparatus in the pool. The stored relation may then be provided to any mobile switching apparatus in the pool on request.

This aspect of the present invention allows to achieve high data consistency in a very efficient manner in that all mobile switching apparatuses of the pool have access to the same pool data base. Further, the administrative effort for the network operator is minimized as only a single data base has to be supplied with data and subsequently be updated. Yet another advantage of the provision of a single pool data base is that the relation between an issued paging method and a received paging response may be resolved within a minimum time period. This particularly is the case when the pool data base also supplies information for call setup to a mobile switching apparatus in the pool handling a paging response from the access network.

According to a preferred embodiment of the pool of mobile switching apparatuses the pool controller is connected to a capability data base storing service capabilities of at least one mobile switching apparatus in the pool and/or the service availability of at least one mobile switching apparatus in the pool.

The provision of a capability data base allows for an efficient load sharing mechanism between the mobile switching apparatuses in the pool. Additionally, mobile equipment terminating calls may be grouped according to related service profiles to specific mobile switching apparatuses in the pool in compliance with the data stored in the capability data base. In addition, it may be possible to indicate shutdown of a specific mobile switching apparatus to avoid any loss of signaling traffic running over the pool of mobile switching apparatuses and therefore also to avoid any loss of revenue for the network operator.

According to yet another preferred embodiment of the inventive pool of mobile switching apparatuses, the pool controller is adapted to select a mobile switching apparatus in the pool randomly, in a predefined order, according to a service capability and/or according to a service availability profile stored in the capability data base.

According to this preferred embodiment, the operation of the pool controller may be configured according to different requirements, e.g., maximum load sharing in the pool of mobile switching apparatuses, avoidance of signaling traffic interruption, etc., while the pool of mobile switching apparatuses behaves to the outside world as one mobile switching apparatus.

While in the above specific embodiments of the mobile switching apparatus according to the present invention and the integration of a plurality of such mobile switching apparatuses into a pool have been described, in the following a third aspect of the present invention being related to the interfacing between the call network and the access network will be referred to.

In particular, the third aspect of the present invention relates to a router apparatus for operation between at least one access network control apparatus and a pool of mobile switching apparatuses as outlined above.

According to the present invention, the router apparatus comprises a pool interface unit connecting the router apparatus to each mobile switching apparatus in the pool and further an access network interface unit adapted to connect the router apparatus to the at least one access network controller apparatus. A selection unit is provided to select a mobile switching apparatus in the pool for connection to an access network controller apparatus for at least one signaling connection. The relation between the mobile switching apparatus in the pool, the related access network controller apparatus and the signaling connection can be stored in a storage unit. To handle a plurality of signaling connections, there is provided a bridging unit between the pool interface unit and the access network interface unit to selectively connect one access network control apparatus with one pooled mobile switching apparatus in accordance with signaling related information stored in the storage unit. For connectionless signaling messages no storage of information is necessary.

Therefore, the router according to the present invention enables stand alone dynamic routing of signaling messages. The router may be used to connect either second generation access nodes like BSCs or third generation access nodes like RNCs without impact on the functionality of the access node. Further, the router may support the exchange of both connection oriented messages and connectionless messages, e.g., on a signaling connection control part SCCP user level.

A further advantage of the inventive router apparatus is that it is freely configurable to be connected to a plurality of mobile switching apparatuses and also to a plurality of access nodes. Alternatively, the router apparatus may be connected to a plurality of mobile switching apparatuses and to only a single access node. Yet another alternative would be to integrate the router apparatus into a single access node, BSC, e.g., into a base station controller BSC or a radio network controller RNC. All alternatives achieve a transparent link between the mobile switching apparatus pool and the group of access nodes such that from the access node point of view the router apparatus acts like a mobile switching apparatus (with the exception that signaling messages—e.g. connectionless signaling messages—may be altered) and from the mobile switching apparatus point of view the router apparatus acts like an access node meaning that there exists no impact on the core network and access network architecture.

According to another preferred embodiment of the present invention there are provided computer program products directly loadable into the internal memory of processors running in a pooled mobile switching apparatus or controller, e.g., a pool controller, a router apparatus and access network controllers BSC/RNC, and comprising software code portions for performing the method steps according to the present invention when the product is run on the processor.

Therefore, the present invention is also provided to achieve an implementation of the inventive method steps on computer or processor systems. In conclusion, such implementation leads to the provision of computer program products for use with a computer system.

These programs defining the functions of the present invention can be delivered to a computer/processor in many forms, including, but not limited to information permanently stored on non-writable storage media, e.g., read only memory devices such as ROM or CD ROM discs readable by processors or computer I/O attachments; information stored on writable storage media, i.e. floppy discs and harddrives; or information convey to a computer/processor through communication media such as network and/or telephone networks via modems and/or internet or other interface devices. It should be understood that such media, when carrying processor readable instructions implementing the inventive concept represent alternate embodiments of the present invention.

BRIEF DESCRIPTION OF DRAWING

In the following, the best mode of carrying out the invention as well as further advantages, objects and preferred embodiments thereof will be described with reference to the drawing in which:

FIG. 3 shows a schematic diagram of a mobile switching apparatus supporting the pool concept according to the present invention;

FIG. 4 shows a schematic diagram of an access node supporting the pooling concept according to the present invention;

FIG. 5 shows a first phase of signaling traffic during a terminating call setup to a mobile terminal;

FIG. 10 shows signaling traffic for connection setup signaling, data transfer, and disconnect between a mobile switching apparatus in a pool, the dynamic router node, and an access network node.

BEST MODE OF CARRYING OUT THE INVENTION

Figure 1:
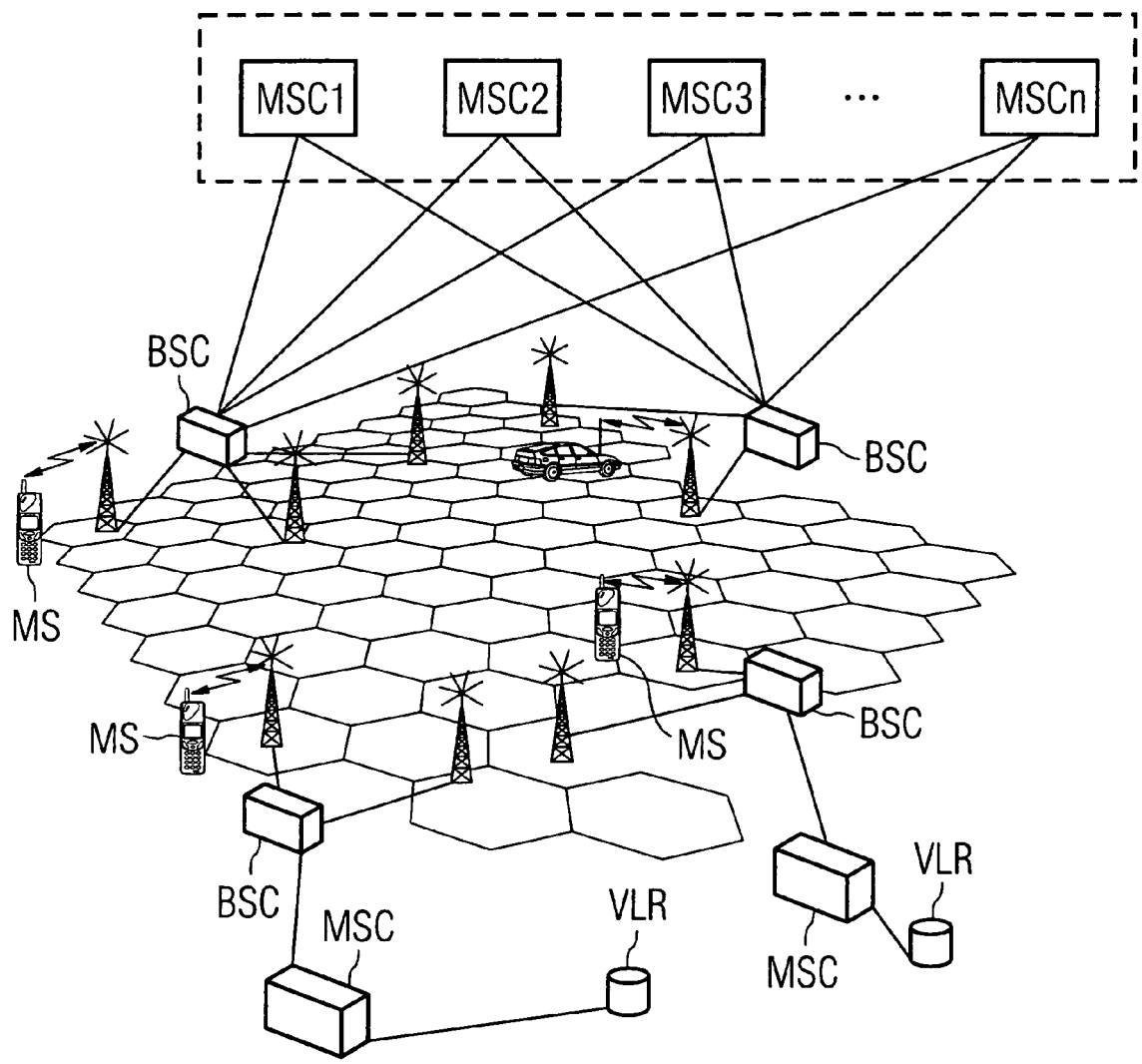
FIG. 1 shows an overview on a pooling concept according to the present invention supporting relay functionality for mobile station terminating signaling.

In the following, the best mode of carrying out the present invention as well as preferred embodiments thereof, further objects and further advantages will be explained with respect to the drawing. Insofar as different features of the present invention are explained with respect to certain aspects thereof, it is understood that these features are combinable with each other to achieve various other modifications and variations of the present invention.

FIG. 1 shows an overview on a pooling concept according to the present invention supporting relay functionality during mobile station terminating signaling. This pooling concept allows for the extension of service capabilities in an existing mobile cellular communication network.

Figure 11:
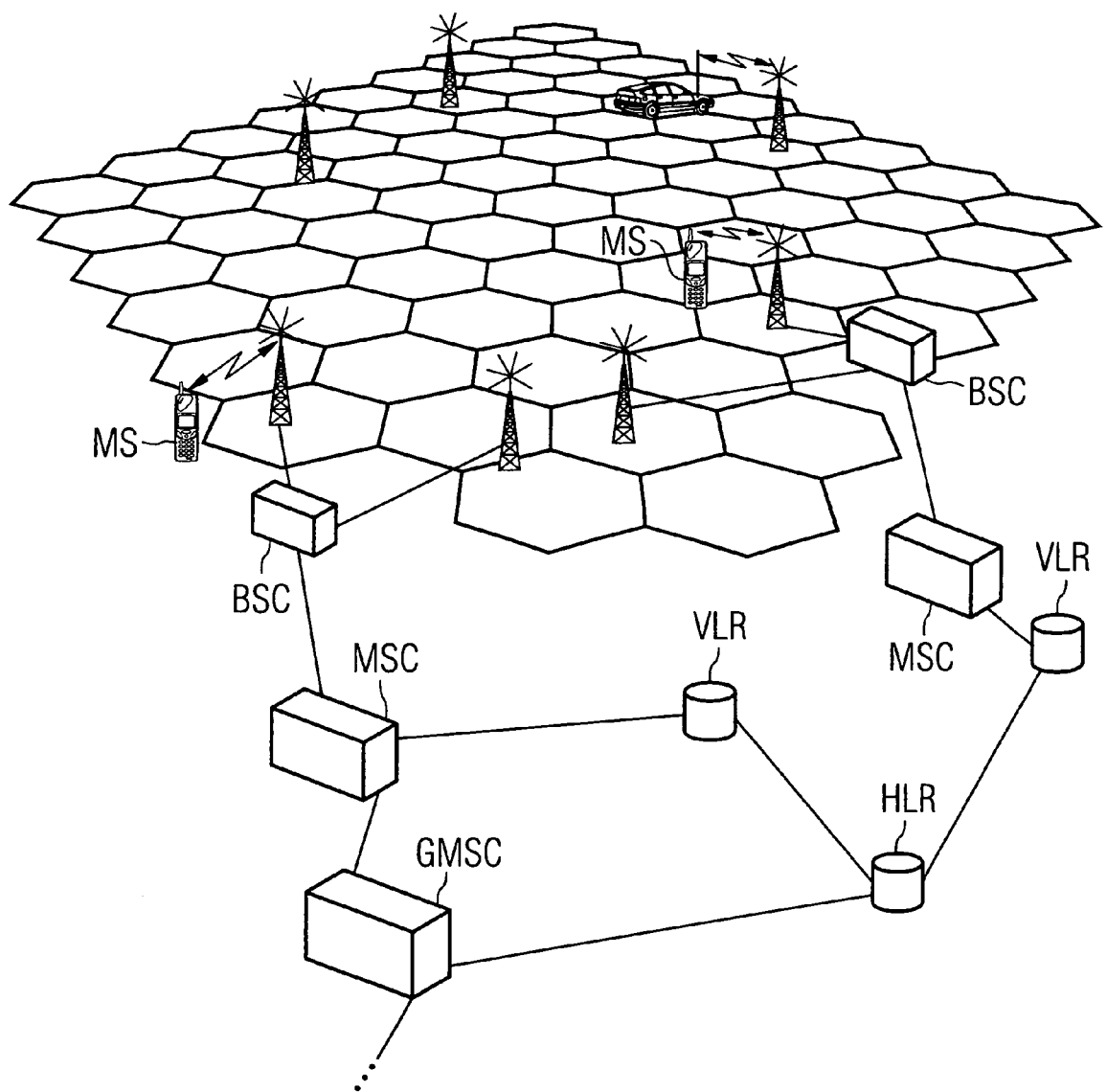
FIG. 11 shows a schematic diagram of a usual mobile cellular communication network.

Components similar or identical to those previously discussed with respect to FIG. 11 have been denoted using the same reference numerals and the repeated explanation thereof is omitted. Further, in the following those elements upstream the mobile switching apparatus pool—e.g., HLR, VLR, GMSC—will be referred to as core network while the components downstream the pool of mobile switching apparatuses—e.g., BSC/RNC—will be referred to as access network. Further, it should be noted that while terminology known from, e.g., second generation GSM, PCS, ... mobile communication is shown in FIG. 1, clearly the present invention is as well applicable to third generation core and access networks comprising, e.g., radio network controllers RNC instead of BSC controllers. Clearly, all these variations and modifications are to be considered as being covered by the following embodiments of the present invention.

As shown in FIG. 1, according to the present invention it is proposed to provide a pool of mobile switching apparatuses—e.g., mobile switching centers MSC1, ..., MSCn—to extend the service capability of a mobile cellular communication network. Here, the pool of mobile switching apparatuses may be accessed by the core network in the same way as a single mobile switching apparatus which also is the case for the access by the access network. Therefore, the pool of mobile switching apparatuses in the sense of the present invention provides a transparent switching unit between the core network and the access network.

As also shown in FIG. 1, an access node—e.g., a base station controller BSC linked to the pool of mobile switching apparatuses—may have access to a plurality of mobile switching apparatuses in a pool. In other words, the mobile switching apparatuses in a pool are grouped with a shared responsibility for all access nodes in the access network served by the pool.

As already outlined above, this approach allows to extend service capabilities in existing cellular communication networks. As long as the radio frequency occupation for the different cells of the mobile cellular communication network remains unchanged, this is achieved with minimum impact on the access network. At the same time it is possible to support specific services through addition of dedicated mobile switching apparatuses—e.g., offering specific devices which are not generally available in the pool—to the pool and to achieve maintenance and recovery services.

In the following, a more detailed explanation of the inventive pooling concept will be given with respect to FIGS. 2 to 7.

Figure 2:
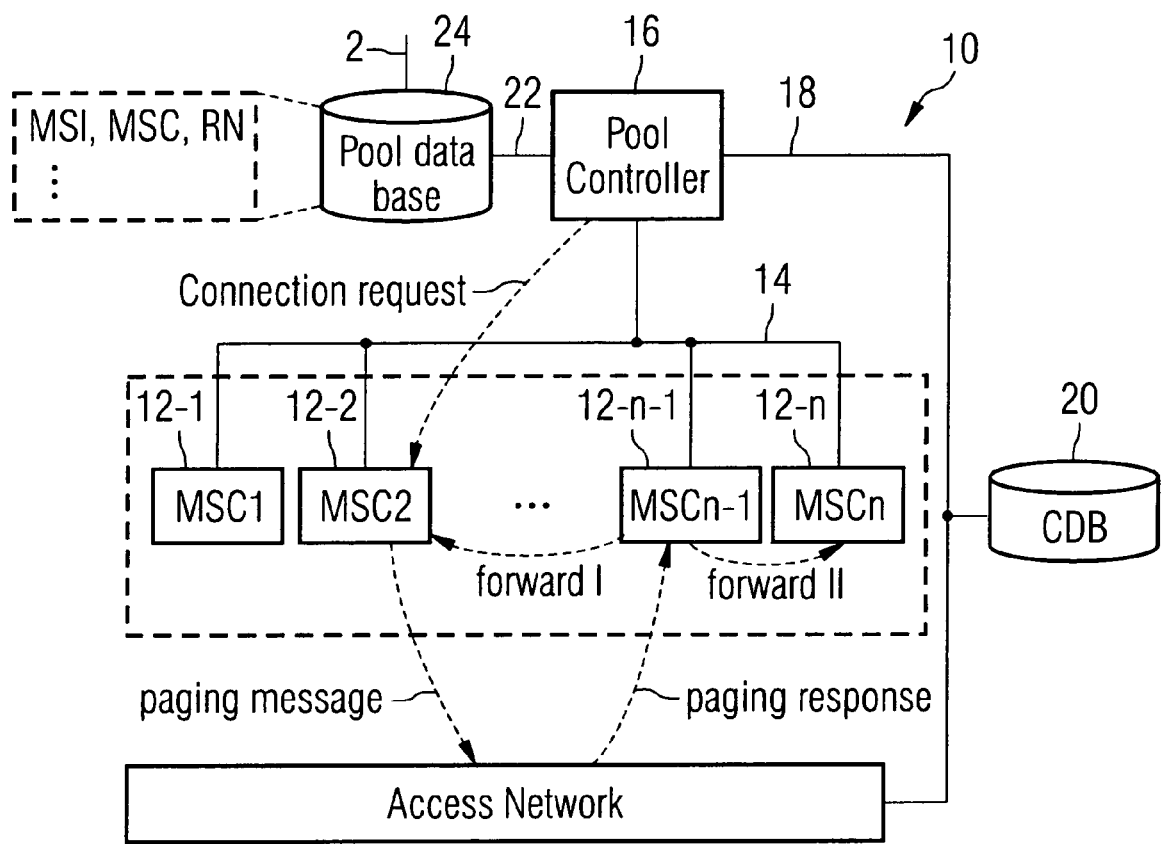
FIG. 2 shows an control layer architecture for a pool of mobile switching apparatuses according to the present invention.

FIG. 2 shows an control layer architecture for a pool of mobile switching apparatuses according to the present invention.

As shown in FIG. 2, the pool 10 consists of a plurality of mobile switching apparatuses 12-1, 12-2, ..., 12-n which are connected via a bus 14 to a pool controller 16. The pool controller is connected via a second bus 18 to a capability data base 20 and to the access network, i.e., to the access nodes comprised in the access network.

A bus in the sense of the present invention may be any type of link, e.g., circuit oriented connections, packet oriented connections, FDDI, IP, ATM, any of onboard bus, etc., as long as an exchange of data is achieved.

As also shown in FIG. 2, the pool controller 16 is connected via a third bus 22 to a pool data base 24. Further, the pool data base 16 is connected via a fourth bus for connection 26 to the core network, e.g., to a home location register HLR and a gateway mobile switching center GMSC of the core network (not shown in FIG. 2). One option to realize the pool data base and the pool controller would be to integrate them into a centralized visitor location register VLR for the pool of mobile switching apparatuses. Then, the external network (HLR/GMSC) is connected to the VLR since all mobile station terminating transactions start with a MAP message handled by the centralized VLR. However, this option should be considered only as an example and not as restricting for the scope of the present invention.

Operatively, the pool of mobile switching apparatuses 10 shown in FIG. 2 provides a mechanism to relay a connection request in a distributed mobile switching apparatus environment from one mobile switching apparatus to another. The mechanism may be applied to a mobile terminating call, to a global paging of mobile terminals, and/or to the handling of requests over multiple processors comprised in a single mobile switching apparatus, as outlined above.

Operatively, a connection request is received by the pool data base 24 which then selects one of the mobile switching apparatuses 12-1, ..., 12-n for the handling of the connection request. In reply to the connection request the selected mobile switching apparatus will forward a paging message to the access network and in case the mobile terminal being related to the connection request is covered by the access network the access network will respond with a paging response to one of the mobile switching apparatuses in the pool, e.g., the mobile switching apparatus 12-n-1. According to the present invention, the paging response may be handled under the control of the pool controller 16 in different ways. The first option is to retrieve the mobile switching apparatus 12-2 issuing the paging message to the access network and then to forward the paging response to this mobile switching apparatus 12-2 after modifying the called address in the paging response from 12-n-1 to 12-2 while the calling address remains unchanged. Using this option has the advantage that all the data necessary for the further processing of the paging response is locally known in the paging message issuing mobile switching apparatus 12-2, thus minimizing further data exchange in the pool of mobile switching apparatuses.

A second option for the processing of the paging response is to carry out this processing in the receiving mobile switching apparatus 12-n-1. In this case it will be necessary to transfer the data necessary for the paging response processing, e.g., from the paging message issuing mobile switching apparatus 12-2 or from data stored in the pool data base 24 what ever is appropriate. The data stored locally in the mobile switching apparatus 12-2 issuing the paging message may then be deleted. The core network is notified of this paging response relay.

A third option for handling the paging response is to use a selection mechanism for the mobile switching apparatus, e.g., 12-n, finally handling the paging response. Also in this latter case a forwarding of data necessary for the processing of the paging response either from the paging message issuing mobile switching apparatus 12-2 or from the pool data base 24 has to be triggered and further the core network is notified of this paging relay. The last option allows to freely select a mobile switching apparatus in the pool best suited for the processing of the paging response, e.g., in view of service capabilities available for each mobile switching apparatus in the pool or resource availabilities.

Further, within the general framework of the present invention when not all access node controllers BSC/RNC communicate with all mobile switching apparatuses in the pool in case a paging response is not handled by the mobile switching apparatus MSC that issued the related paging request a preferred embodiment of the present invention is to handle the paging response in a mobile switching apparatus MSC of the pool having connection to the access node BSC/RNC issuing the paging response.

FIG. 3 shows a schematic diagram of a mobile switching apparatus supporting the pool concept according to the present invention.

As shown in FIG. 3, the mobile switching apparatus according to the present invention comprises a pool relay unit 28, a pool interface unit 30, and a signaling and switching unit 32. The pool relay unit 28 divides into a mobile terminal identification unit 34, a mobile switching apparatus selection and retrieval unit 36, and a paging response modification unit 38.

As also shown in FIG. 3, the signaling and switching unit 32 is connected via a bus 40 to the pool relay unit 28 for communication unit with all components 34 to 38 of the pool relay unit 28. Further, the pool interface unit 30 is connected via a bus 42 to the pool relay unit 28 for communication with all components 34 to 38 of the pool relay unit 28 and via the bus 14 to the pool controller 16 and the pool data base 24. The pool interface unit 30 also enables the exchange of data to the other mobile switching apparatuses in the pool 10.

Operatively, the signaling and switching unit 32 achieves the usual paging and switching functionality between the core network and the access network. This functionality is commonly known in the art and described, e.g., in MOULEY M., PAUTET M.-B., "The GSM System for Mobile Communications", incorporated herein by reference.

Further, the pool relay unit 28 shown in FIG. 3 realizes the relay functions necessary to support the pool concept according to the present invention.

The mobile terminal identification unit 34 in the pool relay unit 28 evaluates whether a mobile subscriber issuing a paging response to the mobile switching apparatus is known locally. This is achieved through an access via the pool interface unit 30 to the pool database 24 shown in FIG. 2 storing a relation between a mobile subscriber identity MSI and a mobile switching apparatus issuing a paging message to the mobile subscriber via the access network. If the mobile switching apparatus receiving the related paging response is identical to the mobile switching apparatus issuing the paging message, the mobile subscriber is assumed to be known locally, otherwise not.

Further the mobile switching apparatus selection and retrieval unit 36 can identify the mobile switching apparatus in the pool that has issued a paging message when a mobile subscriber returning a paging response to the mobile switching apparatus is not known locally. The paging response may then be forwarded by the pool relay unit 28 to the mobile switching apparatus in the pool, which has issued the paging message, for further processing thereof.

Alternatively, the mobile switching apparatus selection and retrieval unit 36 may specify a mobile switching apparatus in the pool of mobile switching apparatuses handling the paging response according to a specified selection algorithm. Alternatively, the information about the mobile switching apparatus handling the paging response according to a specific selection algorithm may be retrieved from the pool controller via the pool interface unit 30 when the selection algorithm is executed in a remote manner. Examples of the selection algorithm are round robin, random, predefined order, etc. Clearly the present invention is not restricted to any specific algorithm and also a combination of different algorithms for the selection of a mobile switching apparatus finally processing a paging response lies within the scope of the present invention.

Yet another alternative to the forwarding of a paging response to either the mobile switching apparatus that issued the related paging message or to a mobile switching apparatus that is selected for the final processing of the paging response is that the signaling and switching unit 32 of the mobile switching apparatus receiving the paging response carries out the processing thereof locally when the mobile subscriber using the mobile terminal issuing the paging response is not known locally.

In the case where the mobile switching apparatus in the pool finally processes the paging response differs from the mobile switching apparatus in the pool that issued the related paging message, the paging response modification unit 33 will change a called address in the received paging response to an address of the mobile switching apparatus finally processing the paging response while leaving the calling address unchanged. Further, the paging response modification unit 38 notifies the core network—e.g., the GMSC/VLR—about the paging message relay.

Also, in the case where the mobile switching apparatus in the pool that finally processes the paging response differs from the mobile switching apparatus in the pool that issued the related paging message, the mobile switching apparatus selection and retrieval unit 36 can issue a command to the mobile switching apparatus issuing the related paging message or to the pool data base 24 for supply of information necessary for the handling of the paging response, e.g., a user profile for the subscriber using the mobile terminal issuing the paging response.

In the following a typical example for the relay of a paging response will be given with respect to signaling connection control part SCCP connection requests issued from a core network to a pool of mobile switching apparatuses according to the present invention. Heretofore it will be assumed that each mobile swichting apparatus is realized as mobile switching center MSC and that the pool controller 16 and the pool database 24 shown in FIG. 2 are integrated into a centralized visitor location register VLR shown in FIGS. 4 and 5.

FIG. 4 shows a schematic diagram of an access node supporting the pooling concept according to the present invention, e.g, a base station controller BSC for $2^{nd}$ generation mobile cellular communication networks or a radio network controller RNC for $3^{rd}$ generation mobile cellular communication networks.

As shown in FIG. 4, an access node 46 having the capability to interact with the pool of mobile switching apparatuses according to the present invention comprises an access node control unit 48 adapted to control radio transceiver stations connected to the access node and adapted to control the communication with the different mobile switching apparatuses in the pool.

As also shown in FIG. 4, the access node comprises a pool controller interface unit 50 for interaction with the pool controller 16 and/or the pool data base 24 and/or the capability data base CDB and a mobile switching apparatus selection unit 52. The mobile switching apparatus selection unit 52 is connected to the access node control unit 48 via a bus 54. The pool controller interface unit 50 is connected to the mobile switching apparatus selection unit 52 via a bus 54.

Operatively, the access node shown in FIG. 4 achieves standard functionally required to control connected radio station transceivers and has access to the core network. This functionality is commonly known in the art and described, e.g., in MOULEY M., PAUTET M.-B., "The GSM System for Mobile Communications", incorporated above by reference.

Further, the mobile switching apparatus selection unit 52 in the access node operatively selects one mobile switching apparatus in the pool. Thus is achieved either through running procedures locally in the access node or by delegating the selection decision to the pool controller 16 and/or capability data base CDB2 and/or the pool data base 24. The selection may be achieved in view of specific service capabilities of the mobile switching apparatuses in the pool, the load of mobile switching apparatuses in the pool, or any other user defined criteria.

FIG. 5 shows a first phase of signaling traffic during call setup to a mobile terminal.

This first phase starts with the reception of a call at the gateway switching center GMSC, step 1. Then the home location register HLR is interrogated to send routing information, step 2. If the subscriber is attached to the cellular mobile communication network the home location register requests a roaming number MSRN/TLDN from the visitor location register VLR where the subscriber is registered, step 3.

After receiving a provide roaming number request in the centralized VLR a mobile switching center MSC in the pool is selected for the processing of the request. This is achieved through interrogation of the capability data base CDB and in view of service and load profile of the mobile switching centers MSC in the pool. The request is then combined with the subscriber profile and submitted as extended request PRN* to the selected mobile switching center MSC, step 4.

As each mobile switching center MSC in the pool has its own range of roaming numbers MSRN/TLDN the selected mobile switching center MSC will select one free roaming number MSRN/TLDN after reception of the extended request and return it to the centralized visitor location register VLR.

In relation to the returned roaming number MSRN/TLDN the selected mobile switching center MSC and/or the visitor location register VLR store the received subscriber data for later use. Using this stored information, later the incoming call may be directly routed by the GMSC to the selected mobile switching center in the pool.

After returning the selected roaming number MSRN/TLDN the selected mobile switching center MSC initiates a paging procedure using the subscriber profile data received in step 4. The selected mobile switching center has to select the access node(s) in the access network for paging the mobile subscriber. Then a paging request message is sent to the selected access node(s) using SCCP connectionless service, step 6. To supervise the paging procedure, a paging supervision timer is started in the selected mobile switching center MSC. As the paging request message is send in the connectionless SCCP mode no signaling transaction is kept alive between the selected mobile switching center MSC and the addressed access nodes.

On the air interface the paging message is broadcast on a dedicated paging channel—see step 6 above. All mobile terminals in a radio resource idle state listen to this paging channel. If a mobile terminal detects a paging message with an subscriber identity that matches its subscriber identity it will establish a connection via the access network within a second signaling phase.

Figure 6:
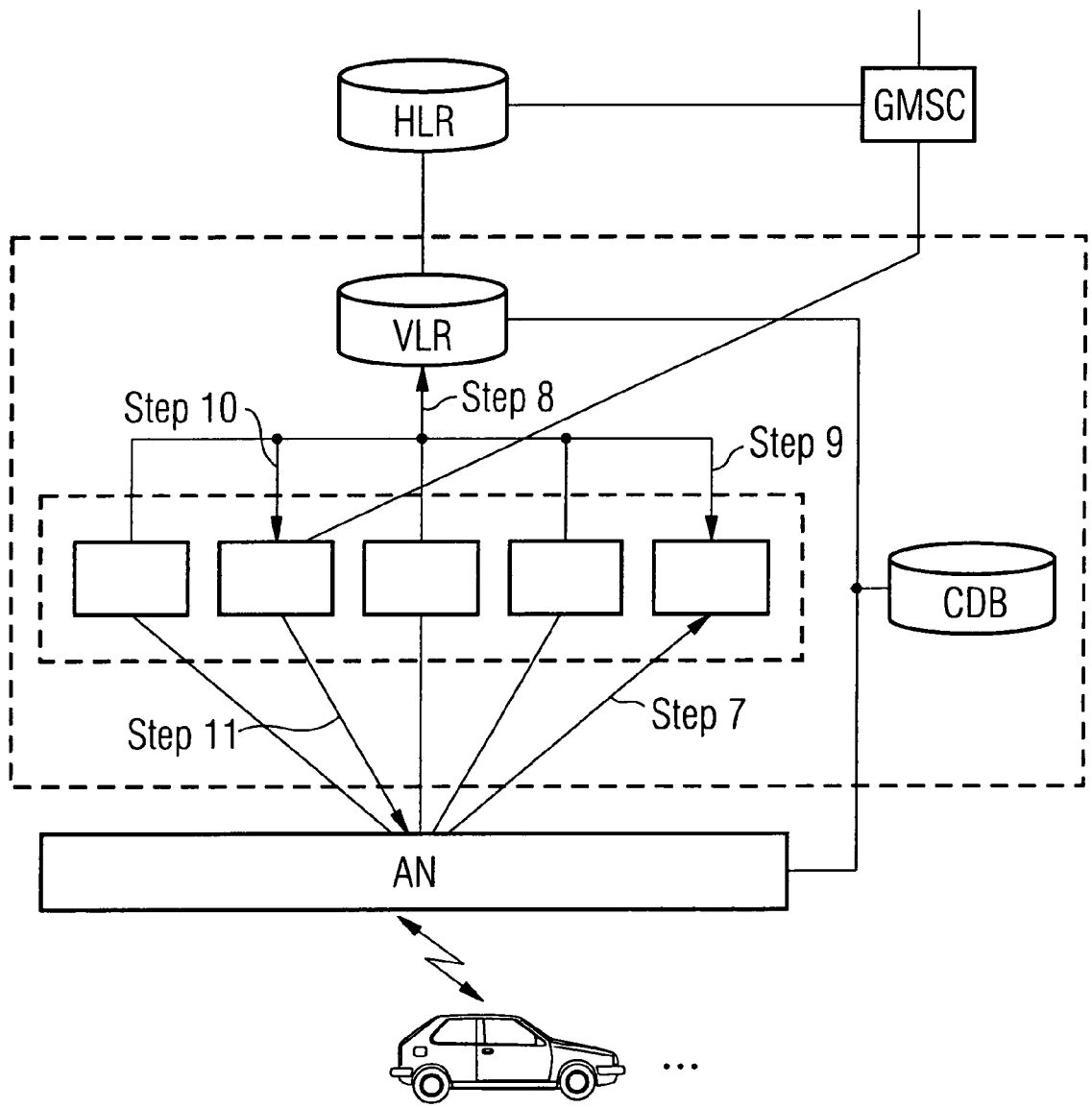
FIG. 6 shows a second phase of signaling traffic during a terminating call setup to a mobile terminal and the relaying of a signaling response.

FIG. 6 shows this second signaling phase during call setup to a mobile terminal and further the relaying of a signaling response.

As shown in FIG. 6, the second signal phase starts with a transfer of a paging response from the mobile terminal. The access network issues a request for a new SCCP connection after selection of a receiving mobile switching center MSC in the pool. As will be explained in more detail below, there exist different options for this selection, e.g., a local selection in the access network or a selection instructed by the pool controller after interrogation of the capability data base CDB.

In the selected mobile switching center MSC the paging response is received and a copy of it is temporarily stored, step 7. Then the paging response is decoded and the identity of the subscriber using the mobile terminal issuing the paging response is determined, as outlined above. If the subscriber is not known locally, a query is performed with the subscriber identity to the centralized visitor location register VLR, step 8.

Then, the centralized visitor location register VLR—or equivalently the pool controller accessing the pool data base—determines the mobile switching center MSC in the pool that was selected in signaling phase one to issue the paging request being related to the paging response. This is the mobile switching center MSC where the paging supervision timer is still running.

After receiving the response from the centralized visitor location register VLR, step 9, the MSC identity is compared with the one of the mobile switching center MSC receiving the paging response. If they do not match, the buffered paging response is—after modification of the called address—forwarded to the paging message issuing mobile switching center MSC in the pool determined in step 8. This may be achieved through a request for a new SCCP connection to this mobile switching center MSC, step 10.

In the paging message issuing mobile switching center MSC the forwarded paging response is decoded. In phase one of the signaling process—i.e., during roaming number allocation—the subscriber profile was already forwarded to this mobile switching center MSC so that the subscriber using the mobile terminal issuing the paging response is known locally. A SCCP connection confirm message is sent to the mobile terminal issuing the paging response, step 11.

As outlined above, the received paging massage may as well be processed locally in the mobile switching center MSC receiving the paging response or in a third mobile switching center MSC selected according to a specified algorithm. Then all information necessary for processing of the paging response—e.g., subscriber profile—must be forwarded to the mobile switching center finally processing the paging response. Also, the core network must be informed about this paging response relay.

As a result of the signaling phases one and two explained with reference to FIGS. 6 and 7, the structure comprising the centralized visitor location register VLR, the capability data base CDB and the pool of mobile switching centers behaves to the outside world os one MSC/VLR, however, with significantly increased fault tolerance and service capabilities. Also, the concepts discussed above may as well be applied different processors of a multiprocessor system in a single MSC/VLR.

Figure 7:
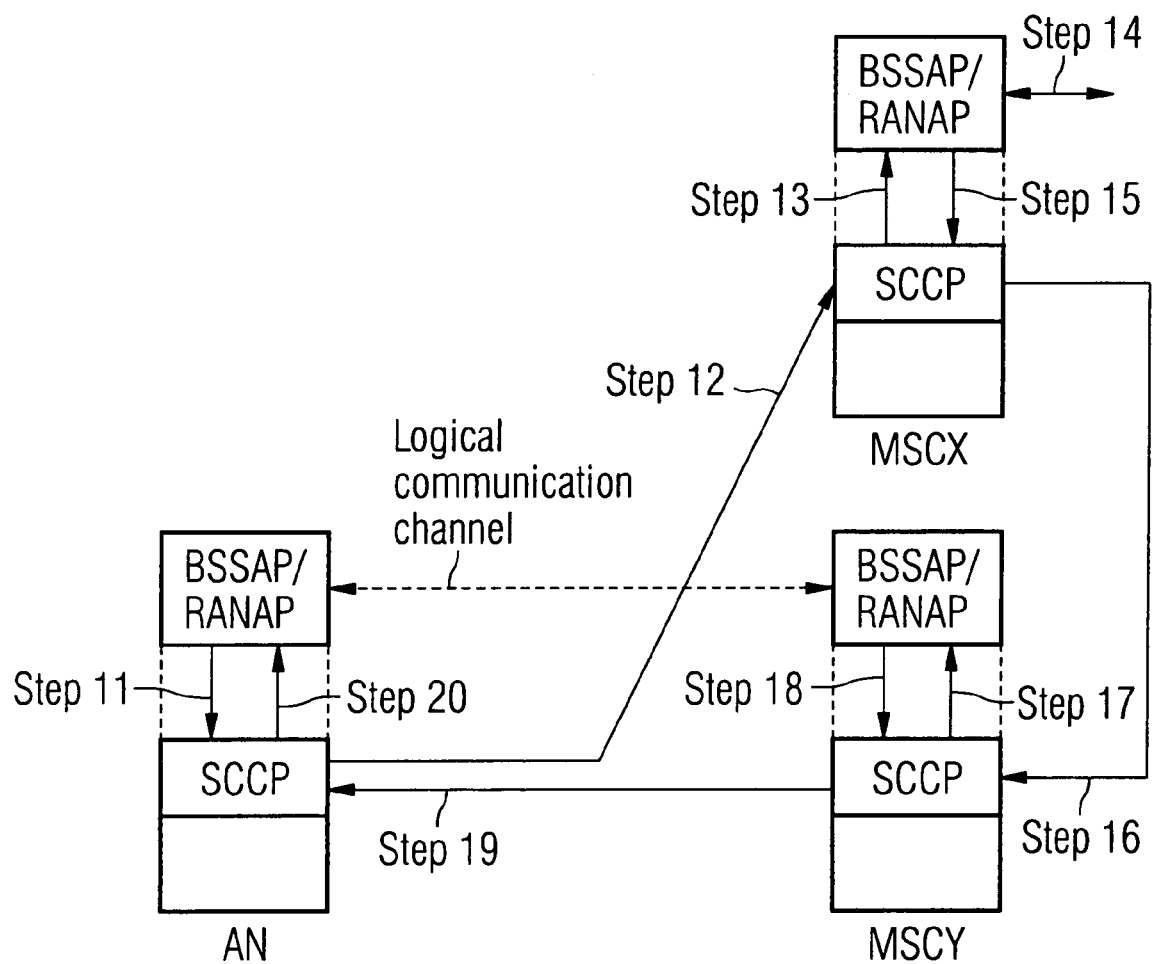
FIG. 7 shows a logical communication model as result of a mobile station terminating signaling procedure using relay functionality according to the present invention.

FIG. 7 shows a logical communication model between the access network and mobile switching centers MSC in the pool as result of the mobile station terminating signaling procedure using the relay functionality according to the present invention.

In the following, the application of the signaling relay functionality according to the present invention to applications running in the access node and/or one mobile switching apparatus in the pool will be explained with reference to FIG. 7.

FIG. 7 shows a base station system application part BSSAP and a radio access network application part RANAP as functional entities—for $2^{nd}$ and $3^{rd}$ generation cellular mobile communication networks—using the signaling connection control part SCCP to establish a communication channel.

As shown in FIG. 7, once a communication has been established, the temporarily used mobile switching center MSC x is not involved any longer in the communication between the core network, the access network and the called mobile terminal.

As also shown in FIG. 7, the establishment of a logical channel divides into a plurality of steps. Initially, the signaling connection control part SCCP user BSSAP/RANAP requests an establishment of a new connection, step 11. This connection request is received in the mobile switching center MSC x, step 12, and the SCCP user in the mobile switching center MSC x receives the service request, step 13. If the SCCP user in the mobile switching center MSC x detects that the mobile switching center MSC x is unable to serve the request, it requests information about an appropriate destination, Step 14, and the service request is then forwarded to this destination, step 15.

The new destination, i.e. the mobile switching center MSC y receives the request in the same way as if it would have been sent directly from the access network, step 16. The SCCP user in the mobile switching center MSC y receives the request and is able to support the service, step 17. The creation of the SCCP connection is confirmed to the access network, step 18.

Finally, the SCCP connection confirm message is received in the access network, step 19, so that the SCCP user in the access network gets the confirmation and updates the connection references accordingly.

Figure 8:
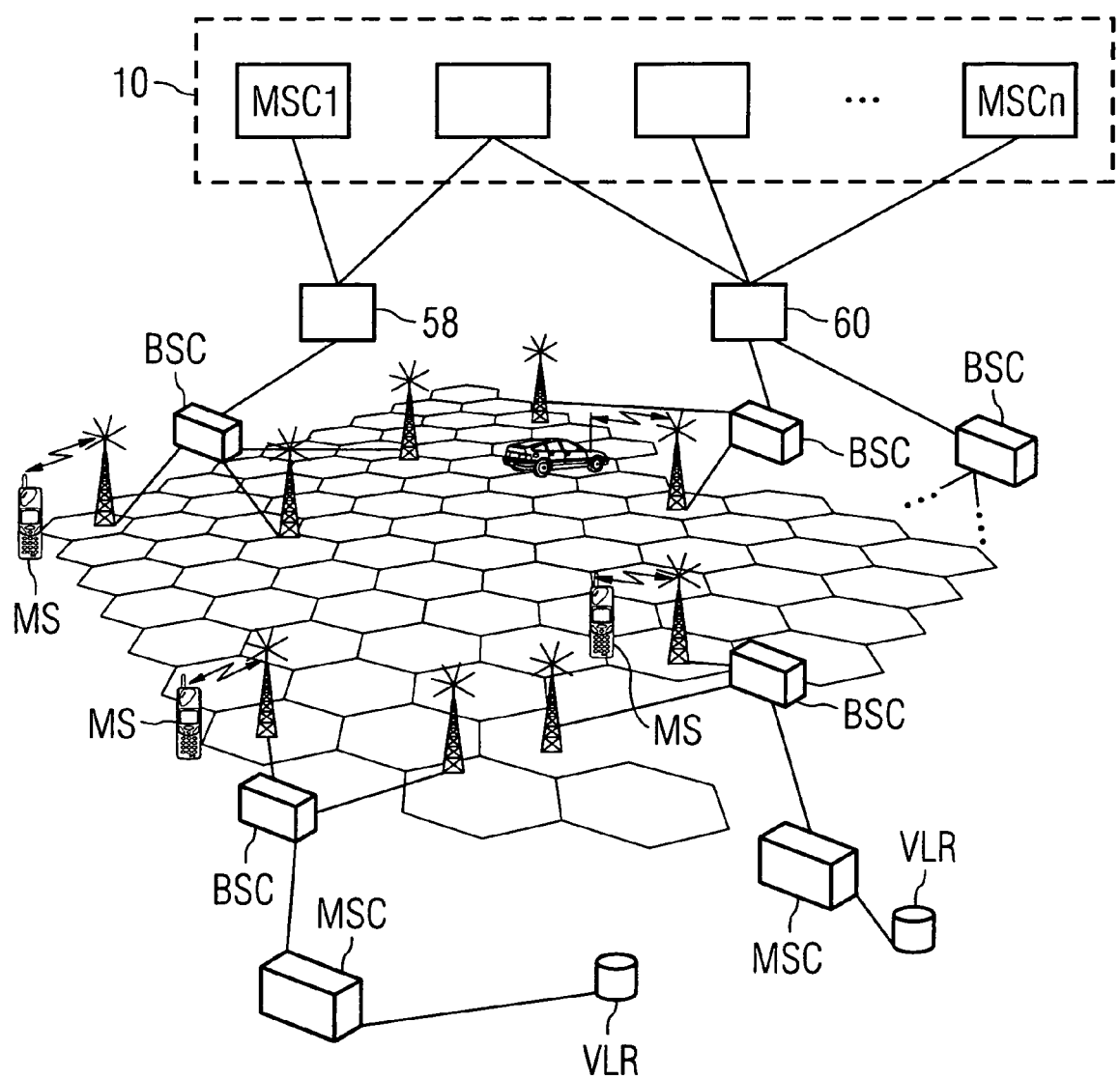
FIG. 8 shows an overview on a further pooling concept according to the present invention relying on transaction based dynamic routing functionality for mobile station originating and/or mobile station terminating signaling.

FIG. 8 shows an overview on a further pooling concept according to the present invention relying on transaction based dynamic routing functionality for mobile station terminating and/or mobile station originating signaling.

As shown in FIG. 8, according to this further aspect of the present invention it is proposed to provide at least one routing apparatus 58, 60 between the pool of mobile switching apparatuses 10 and the access network. Each router apparatus may be connected to at least one mobile switching apparatus in the pool 10 and further to at least one access node in the access network.

Operatively, the router apparatus 58, 60 shown in FIG. 8 provides mobile switching apparatus functionality to the access network and access node functionality to the pool of mobile switching apparatuses. In other words, the router apparatus achieves a transparent link between the pool of mobile switching apparatuses and the access network without necessitating a modification of access nodes pre-installed in the field.

Further, operatively the router apparatus is adapted to route connectionless and connection-oriented signaling traffic between the pool of mobile switching apparatuses and the access network.

Connectionless signaling traffic may be related to, e.g., call establishment using mobile station terminating signaling is outlined above while connection-oriented signaling traffic may be related to mobile station originating traffic, i.e. mobile station originating signaling.

In the both cases the router apparatus provides bridging functionality between a mobile switching apparatus selected in the pool as signaling source/target and an access node selected in the access network as signaling target/source. In the case of connection-oriented signaling the router apparatus further provides functionality to maintain a relationship between a signaling source and a signaling target for mobile station originating and/or mobile station terminating signaling to achieve consistent routing of subsequent signaling messages.

In other words, the routing apparatus according to the present invention is transaction based in the sense that the routing apparatus will route initial signaling messages in a connection-oriented stream between signaling source and signaling target.

With transaction based routing, each signaling message following the initial signaling message in a connection-oriented signaling mode is routed either to a linked mobile switching apparatus available in the pool or to a linked access node available in the access network, based on routing criteria specified.

Further, with transaction based routing each signaling message following the initial signaling message in a connection-oriented signaling mode is routed either to the mobile switching apparatus or to the access node specified for the signaling connection.

While in FIG. 8 the router apparatus is illustrated separately from the access nodes it should be noted that one or more router apparatuses may also be integrated into related access nodes, e.g., within already existing $2^{nd}$ generation base station controllers routing by an upgrade. Since the functionality of such internal routers is almost similar to that of a stand-alone routing apparatus all explanations given so far and in the following also apply to the access node integrated embodiment of the routing functionality and therefore will not be repeated.

Figure 9:
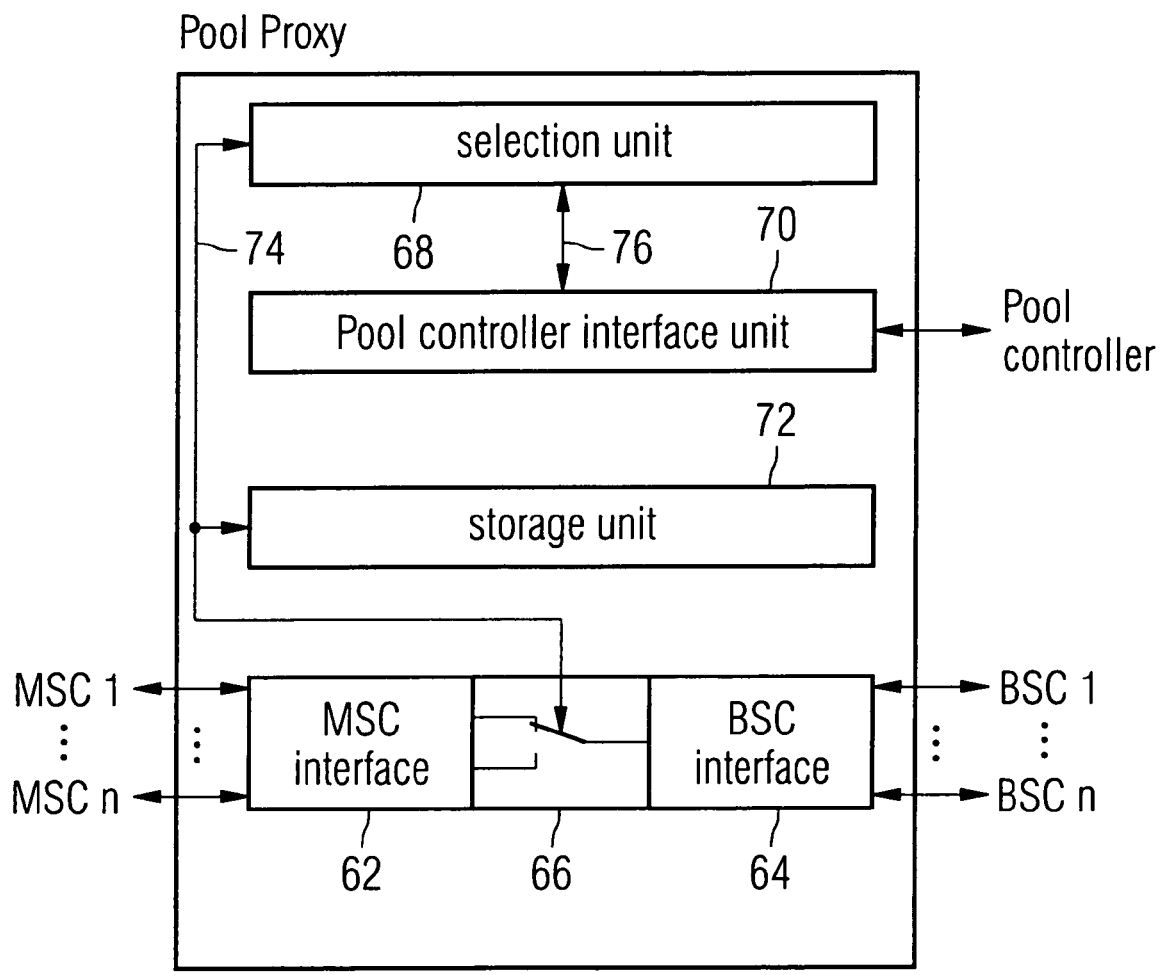
FIG. 9 shows a schematic diagram of a dynamic router node according to the present invention.

FIG. 9 shows a schematic diagram of a dynamic router apparatus according to the present invention.

As shown in FIG. 9, the router apparatus 58, 60 according to the present invention comprises a pool interface unit 62 adapted to connect the router apparatus to mobile switching apparatuses in the pool and an access network interface unit 64 adapted to connect the router apparatus to the at least one access node in the access network. Between the pool interface unit 62 and the access network interface unit there is provided a bridging unit 66 to selectively connect one access network control apparatus with one mobile switching apparatus in the pool according to routing criteria to be explained in the following. It should be noted that the bridging unit is not needed if the router apparatus is integrated into an access node because this functionality is in correspondence to the function of the access node.

As also shown in FIG. 9, the router apparatus further comprises a selection unit 68 adapted to select a mobile switching apparatus in the pool and to select an access network control apparatus for establishment of at least one connectionless and/or connection-oriented signaling connection. The selection may either be determined locally in the router apparatus according to a specified algorithm or through remote access to the pool controller and/or capability data base via a pool controller interface 70. Further, the selection may be based on required capabilities and/or available processing capability. The related data for mobile switching apparatuses and access nodes linked to the router apparatus may be preferably periodically updated, e.g., in the capability data base CDB under control of, e.g., the pool controller.

As also shown in FIG. 9, the router apparatus further comprises a storage unit 72 adapted to store at least one relation between said selected mobile switching apparatus, said access network control apparatus being connect thereto, and a signalling connection. In other words, the maintenance of this relation allows to also support connection-orient signaling traffic both in the mobile station terminating and the mobile station originating direction.

As also shown in FIG. 9, the selection unit 68 is connected to the bridging unit 66, to the pool interface unit 70, and to the storage unit 72 via a bus 74. Further the pool interface unit 70 is connected to the selection unit 68 via a bus 76.

Without restricting the scope of the invention in the following the operation of the router apparatus is explained assuming that the selection unit 68 is implemented as signaling connection control part SCCP user application running on top of SCCP. Clearly, the functionality to be described in the following can also be achieved using different approaches, e.g., a hardware implementation, or a software/hardware combination.

As already outlined above, the router apparatus according to the present invention distinguishes between two types of signaling messages, i.e. connection-oriented signaling messages and connectionless signaling messages.

For each connectionless signaling message the router apparatus will select the target mobile switching apparatus or access node according to an implemented selection algorithm—e.g., load sharing—and then forward the received connectionless signaling message to the target.

To the contrary, connection-oriented signaling messages always start with the establishment of a SCCP connection using the N-CONNECT SCCP primitive. Selection of the signaling target is done when the router apparatus receives an N-CONNECT indication message from a signaling source, e.g., access node. According to the present invention four different N-CONNECT messages are used to successfully set up a SCCP connection:

The originating SCCP user—i.e., the signaling source—sends N-CONNECT request to the selection unit, i.e. the SCCP user application;

The terminating SCCP user—i.e., the signaling target—receives N-CONNECT indication from its SCCP layer;

The terminating SCCP user returns N-CONNECT response to the selection unit;

The originating SCCP user receives N-CONNECT confirm from its SCCP layer.

In addition to the SCCP connection setup with the signaling source the router apparatus must also establish a connection with an actual signaling target which is done before sending the N-CONNECT response to the signaling source.

The router apparatus must update the called address in the same sense as outlined above, and also possibly the calling address for the outgoing N-CONNECT request. Further, for the connection-oriented signaling a connection identification must be stored in the storage unit 72 in relation to the outgoing and optionally also the incoming SCCP connection. One example is to create an entry in a table stored in the storage unit 72 to link two SCCP connections. In more detail, the information used in the table will be the connection identification received on the incoming side in the N-CONNECT message(s) and the connection identification used in at the outgoing side in the N-CONNECT request.

After setup of the outgoing SCCP connection, the router apparatus responds to the signaling source.

Whenever a data message is received in the router apparatus for an already established connection-oriented signaling—identified by the connection identification in the message—the SCCP user application/selection unit 68 will check the received connection identification against the table contents stored in the storage unit 72, find the related entry and forward the data message directly using the corresponding outgoing connection identification.

Finally, each connection-oriented signaling connection is terminated using the N-DISCONNECT primitive.

FIG. 10 shows signaling traffic for connection setup signaling, data transfer, and disconnect between, an access node, the router apparatus, and a mobile switching apparatus in the pool. It is understood that this is only an illustrative example and that the uplink signaling direction may as well be reversed within the scope of the present invention.

The connection-oriented signaling process shown in FIG. 10 relates to connection setup (FIG. 10(a), Nr. 1-10), data transfer (FIG. 10(b), Nr. 11-20), and disconnection (FIG. 10 c), Nr. 21-25).

The connection setup process shown in FIG. 10(a) may be explained as follows:
1. N-CONNECT request;
2. N-CONNECT indication including router apparatus address as called address and 12 as connection identification;
3. Router apparatus selects signaling target MSC, e.g., based on a load distribution meachanism;
4. N-CONNECT request including signaling target MSC and 234 as connection identification;
5. N-CONNECT indication;
6. N-CONNECT response;
7. N-CONNECT confirm including 234 as connection identification;
8. Router apparatus creates entry in connection identification table linking connections with identification 12 and 234 to each other;
9. N-CONNECT response including 12 as connection identification;
10. N-CONNECT confirm.

The data transfer process shown in FIG. 10(b) may be explained as follows:
11. N-DATA request;
12. N-DATA indication including 12 as connection identification;
13. The router apparatus looks up identification table and finds that the data has to be forwarded to signaling connection with identification 234;
14. N-DATA request including 234 as connection identification;
15. N-DATA indication;
16. N-DATA request;
17. N-DATA indication includine 234 as connection indication;
18. The router apparatus looks up identification table and finds that data has to be forwarded to connection with identification 234;
19. N-DATA request including 12 as connection identification.

The data transfer process shown in FIG. 10(b) may be explained as follows:
21. Signaling target decides to terminate connection with N-DISCONNECT request where the related message may include a data part;
22. N-DISCONNECT indication including 234 connection identification;
23. The router apparatus looks up identification table and finds that N-DISCONNECT needs to be forwarded to the connection with identification 12; the router apparatus deletes the corresponding entry from the identification table;
24. N-DISCONNECT request including 12 as connection identification;
25. N-DISCONNECT indication, i.e connection terminated.

While in the above, the present invention has been described with reference to schematic diagrams of preferred embodiments of the invention, it should be noted that clearly the present invention may also be implemented using the methods according to the present invention in a digital way using a microprocessor. In this case, the present invention may be embodied as a computer programme product directly loadable into the internal memory of the microprocessor comprising software code portions for implementing the inventive concepts outlined above.

Further, it is understood that other modifications will be apparent to and can be readily made by those skilled in the art without departing from the scope and spirit of the present invention, e.g., functionalities described may be realized in software, in hardware, or a combination thereof. Accordingly, it is not intended that the scope of claims appended hereto be limited to the description as set forth herein, but rather that the claims should be construed so as encompassing all features of patentable novelty that preside in the present invention, including all features that would be treated as equivalent thereof by those skilled in the art to which the present invention pertains.

The invention claimed is:

1. In a mobile cellular network, a method of controlling communications between an access node and a mobile switching apparatus in a pool of different mobile switching apparatuses, said method comprising the steps of:
    configuring one of the mobile switching apparatuses as a dedicated mobile switching apparatus, said dedicated mobile switching apparatus providing only data services to an identified user group;
    receiving in the access node, a message from a user requiring handling by a mobile switching apparatus capable of providing a requested data service;
    determining whether the user belongs to the identified user group serviced by the dedicated mobile switching apparatus;
    if the user belongs to the identified user group, determining whether the dedicated mobile switching apparatus has available resources to handle the message;
    if the user belongs to the identified user group, and the dedicated mobile switching apparatus has available resources to handle the message:
        selecting from the pool, the dedicated mobile switching apparatus to receive the message; and
        forwarding the message to the dedicated mobile switching apparatus for handling in accordance with the requested data service;
    if the user does not belong to the identified user group, or if the dedicated mobile switching apparatus does not have available resources to handle the message:
        selecting from the pool, a different mobile switching apparatus to receive the message; and
        forwarding the message to the different mobile switching apparatus for handling in accordance with the requested data service.

2. The method according to claim 1, wherein the access node is a base station controller for a second generation mobile cellular network.

3. The method according to claim 1, wherein the access node is a radio network controller for a third generation mobile cellular network.

4. The method according to claim 1, wherein the selecting step includes selecting the dedicated mobile switching apparatus locally in the access node.

5. The method according to claim 1, wherein the selecting step includes delegating a selection decision to an entity outside of the access node.

6. The method according to claim 1, wherein the selecting step includes delegating a selection decision to a pool controller external to the access node, said pool controller controlling the pool of different mobile switching apparatuses.

7. The method according to claim 1, wherein the selecting step includes delegating a selection decision to a capability database external to the access node.

8. The method according to claim 1, wherein the selecting step includes delegating a selection decision to a pool database external to the access node.

9. The method according to claim 1, further comprising:
    receiving in the access node, a paging request directed to the user from a requesting mobile switching apparatus in the pool, wherein the requesting mobile switching apparatus is different from the dedicated mobile switching apparatus, and wherein if the user belongs to the identified user group, and the dedicated mobile switching apparatus has available resources to handle the paging request, the access node forwards a paging response related to the paging request to the dedicated mobile switching apparatus.

10. In a mobile cellular network, an access node adapted to control communications with a mobile switching apparatus in a pool of different mobile switching apparatuses, said access node comprising:
    a mobile switching apparatus selection unit for selecting from the pool, a dedicated mobile switching apparatus which provides only data services to an identified user group, said selection unit selecting the dedicated mobile switching apparatus in response to receiving a message from a user requiring handling by a mobile switching apparatus capable of providing an identified data service, wherein the selection unit selects the dedicated mobile switching apparatus only if the user belongs to the identified user group and the dedicated mobile switching apparatus has available resources to handle the message, and otherwise selects a different mobile switching apparatus;
    a pool controller interface unit for interacting with the mobile switching apparatus selection unit and with at least one of a pool controller, a pool database, and a capability database that identifies the dedicated mobile switching apparatus as a mobile switching apparatus having available resources and being dedicated to providing only data services to the identified user group; and
    an access node control unit for controlling communications to at least one linked base transceiver station and to the dedicated mobile switching apparatus;
    wherein the mobile switching apparatus selection unit is connected to the access node control unit and to the pool controller interface unit.

11. The access node according to claim 10, wherein the access node is a base station controller for a second generation mobile cellular network.

12. The access node according to claim 10, wherein the access node is a radio network controller for a third generation mobile cellular network.

13. A mobile cellular communication system, comprising:
    a pool of different mobile switching apparatuses;
    a base transceiver station;
    at least one of a pool controller, a pool data base, and a capability database;

an access node adapted to control communications with a selected mobile switching apparatus in the pool of different mobile switching apparatuses, said access node comprising:
- a mobile switching apparatus selection unit for selecting from the pool, a dedicated mobile switching apparatus which provides only data services to an identified user group, said selection unit selecting the dedicated mobile switching apparatus in response to receiving a message from a user requiring handling by a mobile switching apparatus capable of providing an identified data service, wherein the selection unit selects the dedicated mobile switching apparatus only if the user belongs to the identified user group and the dedicated mobile switching apparatus has available resources to handle the message, and otherwise selects a different mobile switching apparatus;
- a pool controller interface unit for interacting with the mobile switching apparatus selection unit and with at least one of a pool controller, a pool data base, and a capability database that identifies the dedicated mobile switching apparatus as a mobile switching apparatus having available resources and being dedicated to providing only data services to the identified user group; and
- an access node control unit for controlling communications to at least one linked base transceiver station and to the dedicated mobile switching apparatus;
- wherein the access node is connected to the pool, to the base transceiver station, and to at least one of the pool controller, the pool data base, and the capability database.

14. A computer program stored on an internal memory of a controller of an access node of a communications system, comprising software code portions for performing the following steps when the computer program is run on a processor of the controller:
- receiving in the access node, a message from a user requiring handling by a mobile switching apparatus capable of performing a requested data service;
- if the user belongs to the identified user group, and the dedicated mobile switching apparatus has available resources to handle the message:
- selecting from a pool of different mobile switching apparatuses, a dedicated mobile switching apparatus configured to perform only data services for an identified user group, said selecting step including:
  - determining whether the user belongs to the identified user group serviced by the dedicated mobile switching apparatus;
  - if the user belongs to the identified user group, determining whether the dedicated mobile switching apparatus has available resources to handle the message; and
  - selecting the dedicated mobile switching apparatus only if the user belongs to the identified user group and the dedicated mobile switching apparatus has available resources to handle the message; and
- forwarding the message to the dedicated mobile switching apparatus for handling in accordance with the requested data service.

15. In a mobile cellular network, an access node adapted to control communications with a mobile switching apparatus in a pool of different mobile switching apparatuses, said access node comprising:
- means for receiving a message from a user requiring handling by a mobile switching apparatus configured to perform a requested data service;
- means for selecting from the pool, a dedicated mobile switching apparatus which is configured to perform only data services for an identified user group; and
- means for determining whether the user belongs to the identified user group serviced by the dedicated mobile switching apparatus;
- means for determining whether the dedicated mobile switching apparatus has available resources to handle the message; and
- means for forwarding the message to the dedicated mobile switching apparatus for handling in accordance with the data service only if the user belongs to the identified user group and the dedicated mobile switching apparatus has available resources to handle the message.

16. The access node according to claim 15, wherein the means for selecting is adapted to select the dedicated mobile switching apparatus locally in the access node.

17. The access node according to claim 15, wherein the means for selecting is adapted to delegate a selection decision to an entity outside of the access node.

18. The access node according to claim 15, wherein the means for selecting is adapted to delegate a selection decision to a pool controller external to the access node, said pool controller controlling the pool of different mobile switching apparatuses.

19. The access node according to claim 15, wherein the means for selecting is adapted to delegate a selection decision to a capability database external to the access node.

20. The access node according to claim 15, wherein the means for selecting is adapted to delegate a selection decision to a pool database external to the access node.

21. The access node according to claim 15, further comprising:
- means for receiving a paging request directed to the user from a requesting mobile switching apparatus in the pool, wherein the requesting mobile switching apparatus is different from the dedicated mobile switching apparatus; and
- means for sending a paging response related to the paging request to the dedicated mobile switching apparatus only if the user belongs to the identified user group and the dedicated mobile switching apparatus has available resources to handle the paging request.

22. A mobile cellular communication system, comprising:
- a pool of different mobile switching apparatuses, wherein one of said mobile switching apparatuses is dedicated to providing only data services to an identified user group;
- a base transceiver station;
- at least one of a pool controller, a pool data base, and a capability database that identifies the dedicated mobile switching apparatus as a mobile switching apparatus having available resources and being dedicated to providing only data services to the identified user group; and
- an access node adapted to control communications with a selected mobile switching apparatus in the pool of different mobile switching apparatuses, said access node comprising:
  - means for selecting from the pool, the dedicated mobile switching apparatus in response to receiving a message from a user requiring handling by a mobile switching apparatus capable of providing a requested data service; and means for communicating with the dedicated mobile switching apparatus only if the user belongs to the identified user group and the dedicated mobile switching apparatus has available resources to handle the message; wherein the access node is connected to the pool, to the base transceiver station, and to at least one of the pool controller, the pool data base, and the capability database.

* * * * *